(12) United States Patent
Schmid et al.

(10) Patent No.: US 6,846,901 B1
(45) Date of Patent: Jan. 25, 2005

(54) LIQUID INITIATOR FOR ACCELERATING THE PROGRESS OF THE ANIONIC LACTAM POLYMERIZATION, METHOD FOR PRODUCING THE SAME AND THE USE THEREOF

(75) Inventors: Eduard Schmid, Bonaduz (CH); Ivano Laudonia, Thusis (CH)

(73) Assignee: EMS-Chemie AG, Domat/EMS (CH)

( * ) Notice: Subject to any disclaimer, the term of this patent is extended or adjusted under 35 U.S.C. 154(b) by 31 days.

(21) Appl. No.: 10/168,485

(22) PCT Filed: Nov. 28, 2000

(86) PCT No.: PCT/EP00/11881

§ 371 (c)(1),
(2), (4) Date: Oct. 1, 2002

(87) PCT Pub. No.: WO01/46292

PCT Pub. Date: Jun. 28, 2001

(30) Foreign Application Priority Data

Dec. 21, 1999 (DE) .......................... 199 61 818

(51) Int. Cl.⁷ .................. C08G 69/16; C08G 69/14; C08G 69/18
(52) U.S. Cl. .................. 528/310; 528/312; 528/315; 528/322; 528/323; 528/480; 528/502 R; 502/100
(58) Field of Search ................. 528/310, 312, 528/321, 323, 480, 502 R; 502/100

(56) References Cited

U.S. PATENT DOCUMENTS

| | | | |
|---|---|---|---|
| 3,875,121 A | | 4/1975 | Brassat et al. |
| 4,599,398 A | * | 7/1986 | Hodek et al. ............. 528/312 |
| 5,756,647 A | * | 5/1998 | Schmid et al. ............. 528/323 |
| 5,760,164 A | | 6/1998 | Schmid et al. |
| 5,864,007 A | | 1/1999 | Schmid et al. |
| 5,895,808 A | * | 4/1999 | Schmid et al. ............. 528/310 |
| 6,013,758 A | | 1/2000 | Schmid et al. |

FOREIGN PATENT DOCUMENTS

| | | |
|---|---|---|
| DE | 2 230 732 C3 | 1/1974 |
| DE | 196 02 684 C1 | 8/1997 |
| DE | 196 03 305 C2 | 8/1997 |
| DE | 196 02 683 C1 | 9/1997 |
| DE | 197 15 679 A1 | 10/1998 |
| EP | 0 438 762 B1 | 7/1991 |
| EP | 0 786 482 A2 | 7/1997 |
| EP | 0 786 484 A2 | 7/1997 |
| EP | 0 786 486 B1 | 7/1997 |
| EP | 0 872 508 A1 | 10/1998 |

* cited by examiner

Primary Examiner—P. Hampton Hightower
(74) Attorney, Agent, or Firm—Marshall & Melhorn, LLC

(57) ABSTRACT

The invention relates to a liquid initiator to be used in anionic lactam polymerization. Said liquid initiator contains a reaction product of carbodiimide with a protic compound and a base in an aprotic solvation agent.

31 Claims, 5 Drawing Sheets

Nylostab S - EED 1,3-benzendicarboxamide,N,N'-
bis(2,2,6,6-tetramethyl-4-piperidinyl)

| TINUVIN 571 |
|---|

Mw = 393.6 , Mp = liquid
CAS : 23328-53-2

LIQUID INITIATOR FOR ACCELERATING THE PROGRESS OF THE ANIONIC LACTAM POLYMERIZATION, METHOD FOR PRODUCING THE SAME AND THE USE THEREOF

BACKGROUND OF THE INVENTION

1. Field of the Invention

The invention relates to a novel liquid initiator for the accelerated implementation of the polymerisation of lactam, the production thereof, the use thereof and also the utility objects produced therefrom.

2. Discussion of Related Art

Liquid catalysts for the polymerisation of lactam have been known for a fairly long time. They comprise additives to sodium caprolactamate which have the effect that it is liquid at room temperature. These catalysts do not adequately accelerate the polymerisation and must be applied at a relatively high concentration. Examples are DE 2 230 732 C3 and EP 0 438 762 B1. In DE 19 602 683 and DE 19 602 684, liquid catalysts are described for the first time which additionally exert an accelerating effect on the polymerisation. They comprise in particular N-substituted cyclic ureas or N-substituted acid amides, acylation medium for lactam and commercially available sodium caprolactamate, dissolved in lactam-6. It is disadvantageous that they must be applied in a relatively high concentration which can influence the polymer properties, for example the modulus being reduced, an exudation of the solvation components can occur and also the adhesion to optionally used fillers can be impaired.

In DE 197 15 679 A1, a synthesis of liquid catalyst is demonstrated which eliminates many of these disadvantages. Thus lactam-free sodium caprolactamate is produced directly in the solvation medium and converted preferably with carbodiimide. In order to implement the lactam polymerisation, a weight proportion of approximately 1% of such catalysts is quite sufficient.

A liquid multi-component system for implementation of the anionic lactam polymerisation is known furthermore from DE 196 03 305 C2, in the case of which a solvation medium, a catalyst and an activator are used together as a multicomponent system. In the case of this multicomponent system, the individual components are hence used in a solvation form as liquid catalyst. The limited shelf life inter aha is hereby of disadvantage.

In the methods disclosed to date for polymerisation of lactam by means of liquid catalyst with accelerated effect, the used starter material are mainly sodium caprolactamate, acylating compounds and also solvation media. For many applications however, liquid systems are desired which comprise only one component and which contain no sodium caprolactamate and hence can be applied in an even smaller concentration. It is furthermore the objective to make available sodium caprolactamate-free liquid systems which are able to control the start-up phase of polymerisation in a targeted manner.

Furthermore, liquid systems with a long shelf life are of great interest which contain components which positively influence the processing behaviour and also the end product properties, such as for example facilitate the release of the finished parts or else improve oxidation-, heat- and weathering stability.

SUMMARY OF THE INVENTION

This object is achieved by a liquid initiator for implementation of anionic lactam polymerisation, comprising a reaction product of carbodiimide C with a protic compound P and a base B in an aprotic solvation medium S. A method of producing this liquid initiator comprises producing the reaction product in the solvation medium S under inert gas control and exclusion of moisture in the range of room temperature up to 140 C., low molecular solvents for the base and neutralization products of the base. A polymer granulate can be produced by continuous or discontinuation anionic polymerisation of lactam with a liquid described above. Commercial products can be made from the liquid initiator and process as described above.

BRIEF DESCRIPTION OF THE DRAWINGS

The above, as well as other advantages of the present invention, will become readily apparent to those skilled in the art from the following detailed description when considered in the light of the accompanying drawings in which.

DESCRIPTION OF THE PREFERRED EMBODIMENT

Figure 1:
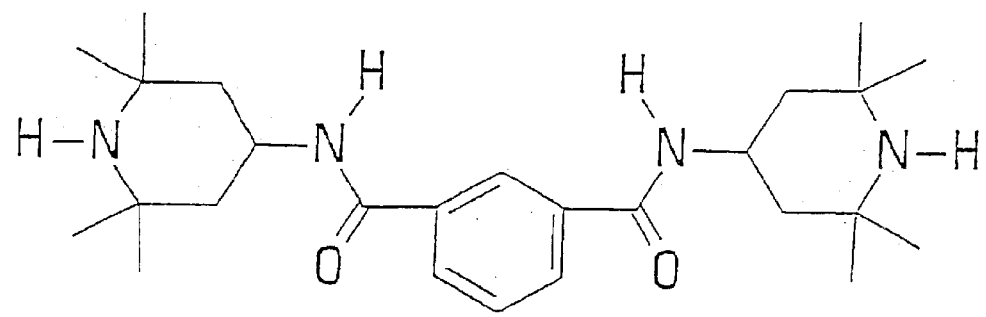
FIG. 1 shows the chemical structure of Nylostab S-EED (1,3-benzendicarboxamide, N,N'-bis (2,2,6,6-tetramethyl-4-piperidinyl).
Figure 2:
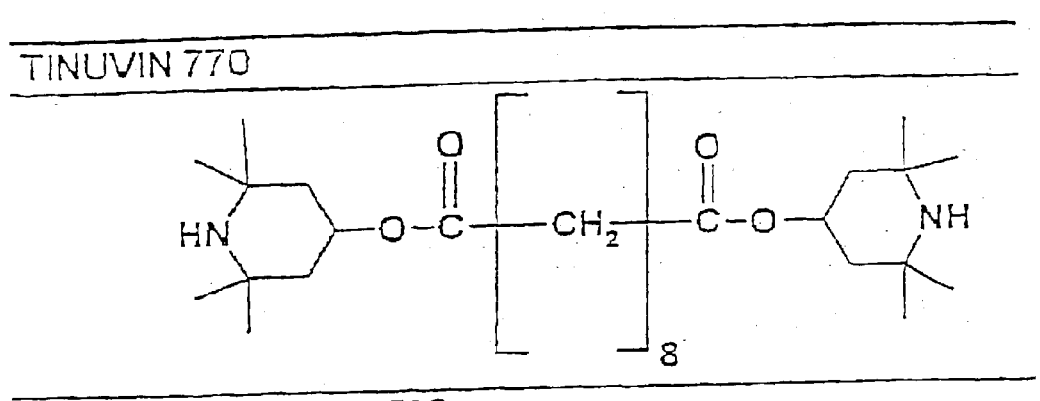
FIG. 2 shows the chemical structure of Tinovin 770, along with physical properties thereof.
Figure 3:
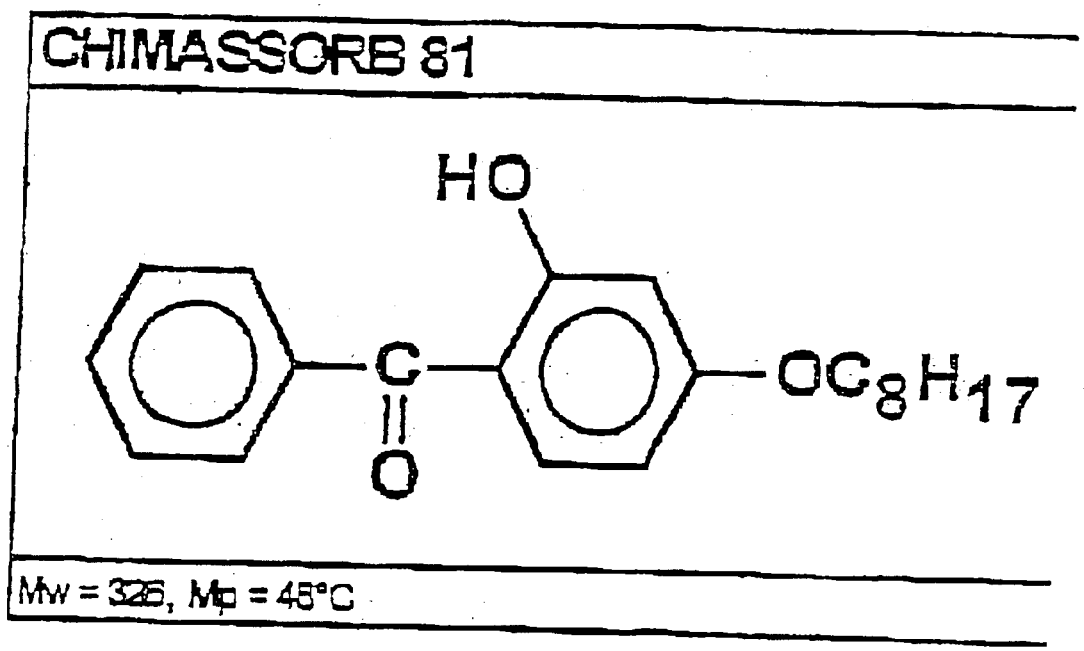
FIG. 3 shows the chemical structure of Chimassorb 81, along with physical properties thereof.
Figure 4:
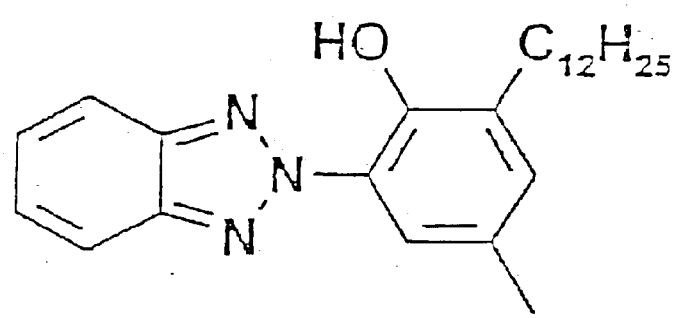
FIG. 4 shows the chemical structure of Tinuvin 571, along with physical properties thereof.
Figure 5:
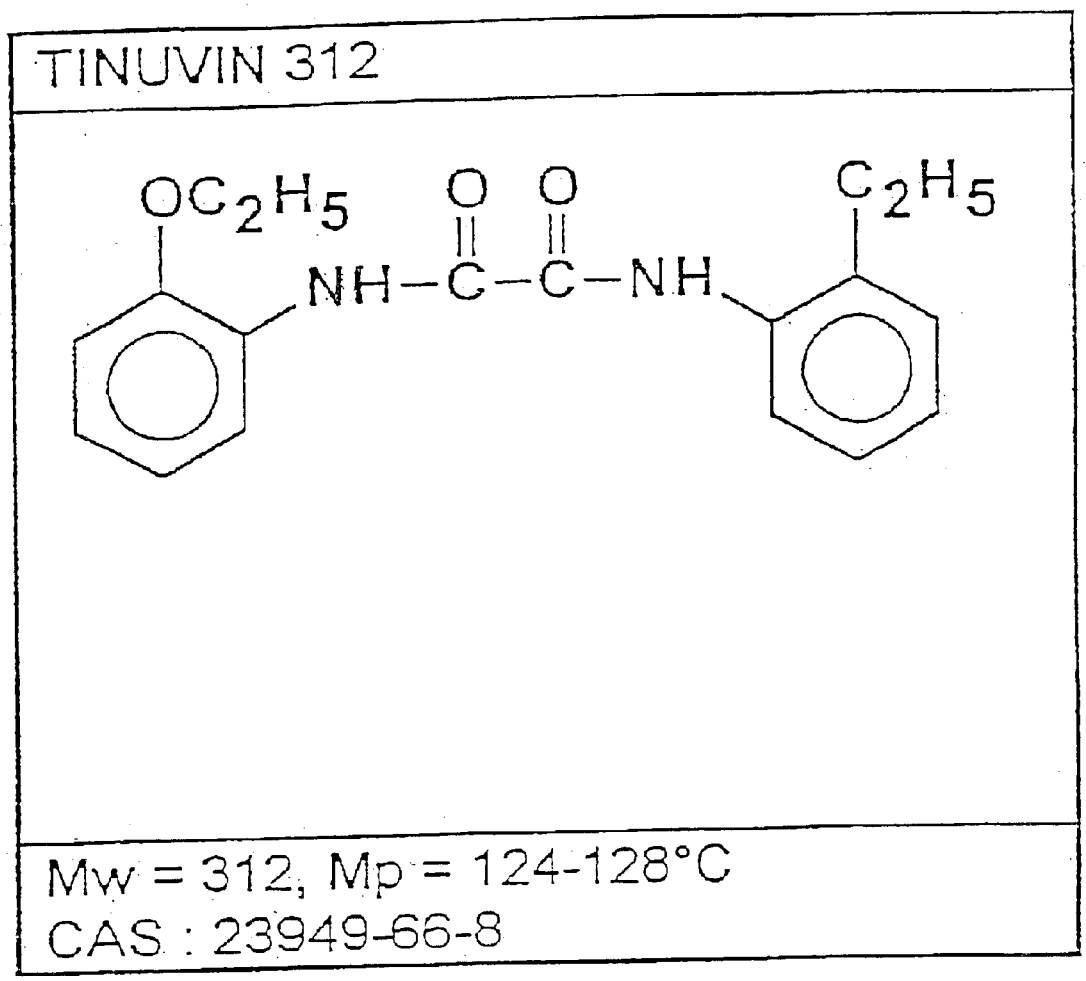
FIG. 5 shows the chemical structure of Tinuvin 312, along with physical properties thereof.

The invention therefore relates to a liquid initiator (FI), a method for producing the same and the use thereof.

The initiator according to the invention therefore replaces the multicomponent systems which are known to date from the state of the art. The initiator thereby inherently contains the activator function and forms the catalyst in a defined second step.

It is a characteristic of the initiators according to the invention that the metal lactamate required for the anionic polymerisation of lactam does not yet exist but is only formed in an advance reaction. The polymerisation of lactam by means of the initiators according to the invention can be effected in discontinuous and in continuous methods and leads to utility objects, in comparison to the state of the art, of very significantly increased value, because the liquid catalyst according to the invention not only effects the accelerated polymerisation of lactam but can also directly improve the end product properties to a specific degree.

It is particularly favourable that the solvation medium S is chosen specifically from a multiplicity of aprotic compounds and can be adapted to the structural composition of the initiator so that, polymerisation-initiating compounds produced via the reaction of protic compounds P, with carbodiimide and deprotonation can generally be solvated and liquefied so that a multiplicity of liquid catalysts adapted to the respective purposes are possible.

It is advantageous furthermore that, via the choice of carbodiimide, initiators are possible which initiate polymerisation with different time delays. This is particularly advantageous in the case of production of fibre composite materials where the main requirement is that, during a definable time interval, a low viscosity of the activated melt occurs which permits impregnation of the pre-formed fibre structure which is then however fully polymerised out subsequently so that for example composite materials with excellent usage properties result.

For many applications, a time-delayed start of the viscosity increase of the newly activated lactam melt is of great interest with respect to application, in particular when the melt is processed directly according to special methods and a forced mixing can no longer occur, such as for example immersion and spraying processes, rotational moulding, in the RTM method, pultrusion, in monomer casting and in reaction injection moulding. In many such processing cases, it is crucial with respect to the application that the newly activated lactam melt can be adapted in its polymerisation behaviour to the used methods, and the matrix is improved in its usage value when polymerisation is completed. Hence it is important that the melt already experiences periencs protection against oxidation, is of high melt-flow and, after polymerisation is completed, the finished part spontaneously releases and is protected against decomposition.

It is of particular advantage that the liquid initiator need only be added in a small application concentration of 1–10% because the protic component P, which becomes part of the polymerisation-initiating proportion during synthesis, is released again during polymerisation and subsequently can take over the provided additional task.

In many cases for such additional tasks, a compound to be chosen specially need not be added separately to the initiator. Said compound would then likewise need to be liquefied which would increase the application volume of the liquid initiator and would impair in many cases the activity of the liquid initiator also.

In the case of the presented invention it is the case that, for the provided additional task, protic compounds can be selected from a multiplicity of additives which are available and which unexpectedly take over the task of the lactamate in the structural composition of the liquid initiator according to the invention.

It is probable in the reaction progress that, after introduction of the liquid initiator into the lactam melt, the activated lactam and the lactamate form in special reaction pre-stages and thereby release again the protic compounds P, after which it can take over the additional tasks.

After deprotonation of P with the base B and reaction with the carbodiimide, the structural composition of the initiator can be imagined for instance as follows;

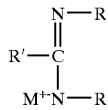

R' being the deprotonated, protic component and the one nitrogen now carrying a negative charge and the cation $M^+$ being derived from alkali or alkaline earth metals and also tetraalkyl ammonium.

If this initiator according to the invention is now introduced into the lactam melt, the likewise protic compound, the lactam, now occurring at a high excess, an exchange of R' for lactam is effected, R' now being protonated and released and so being able to take over the task assigned to P, for example stabilisation.

At the same time, the negative charge at the "N" will take over an H-atom from a lactam whereby lactamate, the so-called catalyst for the anionic lactam polymerisation, being produced.

Because by exchanging R' for lactam at the acylating carbodiimide, an activated lactam structure has now formed and at the same time lactamate has been produced via an H transfer, the activated anionic lactam polymerisation can now proceed.

Experiments with respect to toxicity have shown that commercially available carbodiimides generally contain a residual proportion of isocyanate which is mainly responsible for the high environmental threat, in particular toxicity of such products. During the conversion of the carbodiimide C with the strong base B in the course of the FI synthesis according to the invention, such residual proportions of the reactive isocyanate are decomposed so that toxicity of the FI is reduced.

In addition, the carbodiimide goes into a conversion with the deprotonated P, so that its reactivity is reduced and also its volatility is significantly reduced.

The high basicity, which should be taken into account during handling with the FI, still remains unchanged.

Aliphatic, cycloaliphatic and aromatic organic compounds with solvating structural elements, which have no azide H-atoms, are suitable as solvation media S. Solvation structural elements in the sense of the invention are for example heteroatoms and hetero groups of the type: —O—, —CO—, —O—CO—O—, —SO$_2$—, —CO—NR—, —CO—O—, —NR—CO—O, —NO—, —CN—, —RN—CO—NR—, —NR—, —P(OR)$_3$—, —PO(OR)$_3$—and also phenol ether.

The lines on the structural elements thereby imply the chemical bonds of the structural elements in the organic compound which represents the solvation medium and a solvation medium molecule can contain a plurality of solvating structural elements.

The solvation medium can also be a mixture of a plurality of solvating components.

Suitable solvating components are in particular N-alkylated, cyclic carboxamides, such as N-alkylated lactam-4, -5 and -6, for example N-methyl-, N-hexyl-, N-cyclohexyl- and N-octylpyrrolidone and also N-octyl and N-methylcaprolactam and completely N-alkylated, in particular cyclic urea derivatives, the alkyl radical R being able to contain 1–12 C-atoms.

These products correspond to the formulae

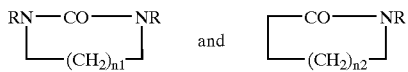

$n_1$ being 2 and 3 and $n_2$ being 3 to 5 and R being an alkyl radical with 1–12 C-atoms which can also contain hetero groups and hetero atoms such as —O—. Suitable, non-cyclic urea derivatives and acid amides are for example tetraalkylurea, such for example, tetrabutylurea, diethylacetamide and dibutylformamide. Further solvation media are for example, cyclic propylene carbonate, etherified polyols, for example of the basic structure H$_3$C—O—(CH$_2$—CH$_2$—O)$_n$—CH$_3$ with a molecular weight up to approximately 1500, esterified polyglycols, such as for example di- and triethylene glycol diacetate, liquid phthalic esters and cyclic ethers, such as for example dioxane. Mixtures of the described solvation media are often used.

The solvation medium S must be in the position by means of its solvating structural elements to solvate the conversion product and thereby in particular the associated cation such that a storage-stable product is produced which is liquid at room temperature. Furthermore it must be sufficiently stable to serve as reaction medium. During initiation of the polymerisation of lactam it must, according to the chosen method variant, boil sufficiently highly in order not to effect bubble formation of the melt or else it must be able to be removed in part or completely, for example during a continuous method, for example in a twin shaft extruder, as a consequence of sufficient volatility. Therefore both high and also low boiling components S are suitable according to the provided application method.

If one wants for example to impregnate reinforcing fibre structures with freshly activated lactam melt without bubbles in a discontinuous process, then solvation media with a boiling point of at least 200° C. are advantageous; if one wants to convert lactam in the extruder continuously into polylactam then a low boiling solvation medium is in particular advantageous with a boiling point for example below 180° C., if a softening effect is not desired.

It is especially advantageous in many cases to extend the solvation component by means of compounds with a special effect. These can for example help to protect the polylactam after completion of polymerisation against the effect of light, heat and oxidation. They should preferably be chosen such that they contain no azide H-atoms.

Components in small quantities which exert a nucleating or releasing effect in the polylactam are often desired, likewise additives with a softening effect, such as for example o-phthalic esters, completely esterified polyols, for example of ethylene glycol or glycerine with acetic acid.

Further, often auxiliary additives relate for example to optical brighteners and so-called tracers. The necessary quantity for use is thereby tested and the state of the art and can be deduced for such products from the technical data sheets.

The carbodiimide C can thereby have an aromatic, aliphatic and cycloaliphatic basic structure. In the case of the aliphatic carbodiimides, those are preferred which have a linear or branched radical with 1–20 C-atoms. Cycloaliphatic carbodiimides are particularly favourable. Preferred thereby are N,N'-dicyclohexyl carbodiimides which can also be substituted.

Specially suited carbodiimides are N,N'-diisopropyl carbodiimide, N,N'-di(o-tolyl)-carbodiimide, N,N'-dicyclohexyl carbodiimide, 2,2',6,6'-tetraisopropylphenyl carbodiimide and poly-(2,2-diisopropyl)-p-phenylene carbodiimide.

Suitable protic media P with a $pk_A$ of at least 13 are for example alcohols from C number 1 upwards to approximately 12, preferably up to 6. Suitable representatives are for example methanol, ethanol, propanol, butanol, hexanol and benzyl alcohol. Methanol is particularly favourable. Furthermore, there are amines, such as for example tridecylamine, which often occurs as a liquid isomer mixture, cyclohexylamine, furthermore OH-terminated polyethylene oxides, polypropylene oxides and polybutylene oxides with preferably a molecular weight below approximately 400 which preferably constitute only one portion of P.

Carboxamides also are especially suitable protic components P. Dependent upon their structural composition, they can substantially influence the starting phase of the polymerisation and can take over additional tasks in the finished part, such as for example improving the release behaviour. Components for carboxamides are monomers with 1–20 C-atoms, for example mono- and diamines such as hexylamine, cyclohexylamine, isotridecylamine, diaminohexane and ether group-containing mono- and diamines and also mono- and dicarboxylic acids such as acetic acid, 2-ethylhexanoic acid, nonanoic acid and adipinic acid. In order to provide low molecular carboxamides, for example a monoamine with a monocarboxylic acid or a diamine with 2 mol units monocarboxylic acid or also a dicarboxylic acid with 2 mol units monoamine are converted thereby.

Furthermore special, generally sterically hindered amines are suitable as protic compounds, which amines are able to stabilise the polylactam against heat and light effect, such as for example the commercial product Tinuvins® 770 by Ciba SC® and also in addition the stabilisers Chimassorb 81®and Tinuvin 571® likewise by Ciba CS, which include OH-groups.

Suitable carboxamides with an excellent stablising effect are furthermore Tinuvin 312® by Ciba SC and also Nylostab® S-EED by Clariant, this product containing in addition sterically hindered amino groups. These amines are also described as "hindered amine light stabiliser" (HALS). The chemical structure of these commercial products is illustrated in the drawings 1 to 5.

These stabilisers are only cited by way of example because sterically hindered amines, carboxamides and especially stabilisers containing hindered phenolic OH are essential compound classes which serve as heat and light stabilisers for polyamides.

Further suitable addition compounds are for example butanonoxime, malonic acid ester, such as for instance diethylmalonate, azo compounds, such as 1,2,4-triazole and 3,5-dimethylpyrazole. Such compounds constitute often only a proportion of P and are used for example preferably in combination with methylate.

The base B used for the neutralisation reaction of P must have a basicity which is adequate for the reaction course and preferably can be withdrawn continuously after the neutralisation on applying heat and vacuum. Alternatively, it can act directly as protic medium P, such as for example methylate.

Preferably used bases have an alkali, alkaline earth or tetraalkylammonium cation and an alcoholate, amide, hydride or alkylate as anion. If the anion is, for example alcoholate or amide, it can act directly as P.

Examples are alkali and alkaline earth metal alcoholates, especially methylates and ethylates, such as for example sodium methylate and -ethylate or alcoholates of lithium, potassium and magnesium or also tetraalkylammonium alcoholate, metal hydrides, such as for example sodium hydride, metal alkyls, such as for example butyllithium, amides, such as for example sodium amide, or else alkali or alkaline earth metals, which can for example be activated by means of iron (II) ions.

If a low molecular alocoholate of alkali or alkaline earth metal, such as for example sodium methylate is used as base, then it is advantageously added directly dissolved in the corresponding alcohol, said alcohol being removed again during and after completed conversion via heat and vacuum effect. This concept can also be applied for others of the cited bases, such as for example butyllithium dissolved in heptane.

In the case of extremely air- and moisture-sensitive bases, such as for example metal hydrides or alkali metal, such as for example sodium, petroleum ether or an alkane can serve directly as protective medium for storage and addition, after which removal of this type of protective medium by applying heat and vacuum.

These solvents and protective media for the base are therefore different in task and effect from the solvating component S.

The liquid initiator according to the invention comprises essentially a solvating, i.e. liquefying-effecting component, the solvating medium S, which solvates and liquefies the negatively charged acceleration-producing component of the liquid initiator and the associated cation, for instance the carbodiimide C with aromatic or (cyclo)-aliphatic basic structure, converted with a protic compound P and deprotonated by a strong base B, the conversion of C being able to be effected also directly with the base.

Dependent upon the type of carbodiimide chosen, the conversion can be effected thereby via the formation of a purely chemical bond (preferably with an aromatic carbodiimide) or via the formation of an addition compound which is stabilised in its structure by the cation (cyclo)-aliphatic carbodiimide.

A broad choice with respect to the protic compound P, the $pk_A$ of which should be greater than 13, exists. here in particular.

Because the protic compound P is released during polymerisation of lactam when using the initiator according to the invention, it can take over numerous additional tasks subsequently in the polylactam matrix, such as: stabilisation of the polylactam matrix against degradation by heat and weathering, improved release of the finished part and increased melt flow of the polylactam.

The protic compound P can also exert a chromophore effect in the finished part, with for example colouration and fluorescence.

Because of the numerous possible effects of the component P, combinations of P are also used advantageously, for example a proportion being for stabilisation, a proportion for improved processing (melt flow and releasing) and a possibly residual proportion being directly the base B.

The solvation medium S must also be chosen specifically adapted to the choice of protic compound P and in particular to its composition so that the total liquefaction of the conversion product is effected advantageously with a minimum proportion of solvation medium.

As a general rule, the production of the liquid initiator FI is effected directly in the solvation medium S.

Well dried (freed of moisture) components should be used preferably, and the process should take place under protective gas.

The components are preferably used in a mol ratio of respectively 1 to each other, the carbodiimide being the basis for the stoichiometric evaluation.

The mol proportion of the base B should thereby lie advantageously slightly above 1 (relative to carbodiimide C) and can exceed C for example by 10% equivalent in order that the total carbodiimide can be converted with the deprotonated compound P and if necessary directly with the residual base B and for example any residual parts of isocyanate can also be completely converted.

Adapted to the desired effect of P, P can thus be varied in its composition. A mol proportion of protic compound P, which exceeds C or B, remarkably should however be avoided because as a result an impairment of the catalyst effect can be produced.

Advantageously, P is applied in deficiency relative to C, the base B, which is not required for the neutralisation of P, then taking over the effect of P and reacting with C.

The synthesis must essentially be controlled such that as far as possible the total proportion of the protic compound P is deprotonated and can react with C. At least a small excess of B is thereby advantageous.

For practical implementation of the method, various possibilities are presented, it being striven for respectively to implement the synthesis directly in S and to isolate no intermediate products as solid material.

Hence conversion of C with P and deprotonation with a strong base B are effected essentially in the solvation medium S, the components being chosen such that a liquid catalyst which is liquid at RT and active is produced.

The process can take place thereby essentially such that P is deprotonated by means of B and then converted with C, C being able to be already present at the beginning. The reaction can thereby proceed also such that as soon as the reaction solution transcends into the strongly basic pH range, P reacts with C and then the neutralisation is effected directly in the conversion product of P with C, which is in particular the case in the case of aromatic carbodiimide.

This reaction course can be illustrated as follows, R'-H representing the protic compound P:

Addition conversion

1.)

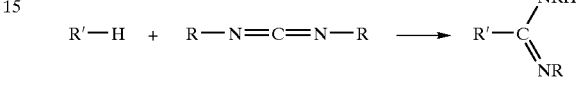

subsequently

2.)

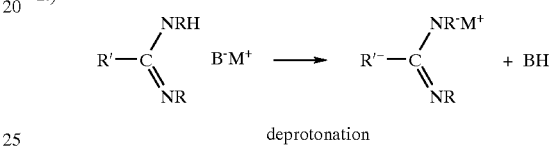

deprotonation $B^\ominus$ representing the base and BH the protonated base, whilst $M^\oplus$ is the associated cation.

If P is deprotonated first and then carbodiimide C is added, then the following reaction course is effected in the case of aromatic carbodiimide:

Structure I

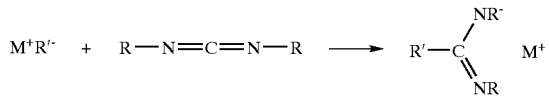

In the case of cycloaliphatic carbodiimide, it can be assumed that the deprotonated P forms with C a type of addition complex which later, upon addition of the liquid initiator to the lactam melt, changes initially slowly into the structure I, so that the initiation of the lactam polymerisation begins with time delay which in many cases is extremely desired.

One can thereby illustrate the reaction course upon addition of deprotonated P to C as follows:

4.)

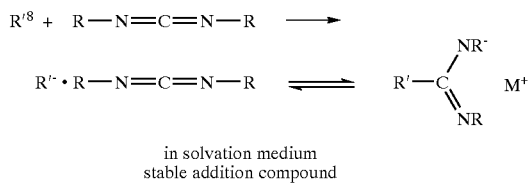

in solvation medium
stable addition compound

The precise structure of the liquid initiator is not finally known. In the illustration about the reaction courses, $M^\oplus$ means respectively the cation, in general $Na^\oplus$, which, via the anion of P and the carbodiimide and in particular the additional solvation medium S can occupy its coordinate positions in a suitable spatial arrangement such that liquefaction into the liquid initiator is effected. In the simple model presentation, one can include the solution of a salt in water as a comparison, water occupying coordination points, i.e. exerting the function of the solvation medium.

If one takes the conversion product of carboxamide anion with aromatic carbodiimide for further understanding,

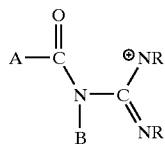

then an ion of the structure is produced: in which the 3 solvation-capable "N" are disposed directly on a central C-atom, the good solvation capacity indeed being based thereon.

The liquid initiator-synthesis can be implemented in a practical test, for example according to the following reaction courses, given by way of example:

P is dissolved in S and subsequently deprotonated via addition of the base B, the temperature of the reaction solution being for example 60–120° C. and the conversion lasting until the volatile neutralization product is completely removed under the action of vacuum and heat.

the base B is added to S, B occurring for example as a finely distributed solid material, then P is added and deprotonated whereafter the protonated base is removed under heat and vacuum effect.

The deprotonated compound P can intermediately precipitate entirely or partly at the conversion temperature of for example 80–100° C.

Now the carbodiimide C is added and if necessary subjected to a secondary reaction with heat and if necessary also vacuum effect and subsequently cooled, after which the initiator which is liquid at RT is present.

The addition of the components is effected thereby preferably in portions or dropwise so that the reaction course can proceed in a targeted fashion under suitable conditions.

The liquefaction upon addition of C can be attributed to the fact that the conversion product of deprotonated P with C can preferably solvate the cation assigned to the base.

A preferred variant proceeds such that C and P are added together at the beginning to the solvation medium and hence, in the presence of C, the deprotonation of P via the addition of B is implemented.

By means of this procedure the formation of solid material during the synthesis can often be prevented because, already at the beginning, adequate solvation sites for the associated cation are available in the conversion product of P with C.

In procedures which are suitable in practice, the base is often added in a solvent. The main example is thereby sodium methylate up to 30% by weight dissolved in methanol, or also metallic sodium in a hydrocarbon, such as petroleum ether as protective medium against attack by traces of atmospheric oxygen. If such solvents or protective media are used for adding the bases, then they are removed during or after the completed neutralisation reaction under a heat and vacuum effect.

The liquid initiator can also be a conversion product in which up to 50% of the carbodiimide have been replaced by isocyanate. There can be used monoisocyanates and diisocyanates and also thioisocyanates which have an aliphatic, cycloaliphatic, aromatic or aliphatic-aromatic basic structure. The aromatic structure can be halogenated and alkylated.

Examples of liquid isocyanates are phenyl isocyanate and substituted phenylisocyanates, cyclohexylisocyanate, toluylenediisocyanate, hexamethylenediisocyanate, isophoronediisocyanate, diphenylmethanediisocyanates, and dicyclohexylmethanediisocynate.

The liquid initiators are used for polymerisation of lactam in continuous and in discontinuous methods.

It has thereby been shown that the time up to the start of the viscosity increase of newly activated lactam melt LC depends greatly upon the concentration of liquid initiator and also upon the temperature of the LC-melt, and also upon the type of liquid initiator which is chosen.

The standard measuring method for comparing the polymerisation course is thereby the time $T_u$ which passes until a magnetic agitator bar remains stationary in the newly activated lactam melt, and this time being designated as $T_u$.

Whilst lactam-12 is polymerised conditional upon its melting point, advantageously at a temperature of more than 170° C. via the addition of liquid initiators, lactam-6 can be activated for example already at 80° C. with liquid initiator conditional upon its significantly lower melting point and subsequently can be subjected to polymerisation with suitable temperature control. It applies thereby that, upon dropping of the temperature, the $T_u$ time and hence the polymerisation course is extended and accelerated when the melt temperature is increased.

If a liquid initiator is shown to be rapid at the chosen conditions, then use of a magnetic agitator bar should be avoided since formation of a homogenous mixture is no longer ensured.

The $T_u$ time is no longer precisely determinable under conditions in which the liquid initiators are rapid, instead the addition must be performed by a rapid and intensively acting mixing process which ensures homogenous mixing.

Hence in conditions in which the initiators rapidly initiate the polymerisation, methods are suitable in which the melt is subjected to a forced mixing after the liquid initiator addition during a fairly long period of time, such as for example the polymerisation of a newly activated melt in a twin screw extruder.

Conditions in which the initiators act rapidly are hence suitable for processes in which a forced mixing and transport of the melt is ensured.

If polymerisation takes place thereby continuously for instance on a twin screw extruder, then a plurality of process steps can be directly implemented in succession with an appropriate construction of the extruder.

Thus polymerisation into polylactam is effected for example in a first, defined zone, then the molten-liquid polylactam can be modified in a defined subsequent process step directly via the addition of additives in the sense of an end product formulation.

The additives, which are thereby added separately or together, comprise the total choice of known polyamide additives, such as for example, stabilisers of any type, glass fibres and minerals, polymers, such as impact modifiers, flame retardants and plasticizers, auxiliary processing aids and dyes and pigments such as carbon black, and also any combinations of such additives.

Subsequently, the melt can be discharged continuously and granulated or else, upon choice of a suitable shaping tool, be processed into a shape directly into an end product, such as for example a pipe or profile. Conditions in which a rapid lactam conversion is effected are therefore suitable when the activated lactam melt is subjected initially to a forced mixing.

A further example of the use of the liquid initiators according to the invention is reaction injection moulding on an injection moulding machine with melting extruder, whereby the course of the polymerization is controlled by the amount of the activator, the temperature and the residence time. With suitable choice of the component P of the liquid initiator, the parts are thereby spontaneously released and are stabilised against degradation (heat, weathering and oxidation).

When the temperature of the lactam melt is increased, for example from 200° C. to 250° C. and beyond, relatively slow initiators become likewise faster and are hence suitable in practice equally well for the continuous polymerisation, for example on an extruder.

Slow liquid initiators are particularly suitable for continuous processes in which, during the time interval of low viscosity of the activated lactam melt, special method steps must proceed, such as for example impregnation of rovings disposed in a parallel fashion, also in combination with tissues (or as generally expressed filament structures), fillers also being able to be present in so-called pultrusion processes. The great advantage thereby is that the newly activated lactam melt is thin and capable of wetting during a defined time interval and hence can penetrate and wet filament structures very well, after which the matrix shows a preferred behaviour whereby on appropriate choice of the component P, finished parts spontaneously release and are protected against heat- and weathering degradation.

Lactam melt activated with so-called slow liquid initiators in a continuous manner can of course be processed also in continuous injection, immersion and coating processes, whereby the liquid initiator can be adapted in a targeted manner to the requirements of the respective processing process via special choice of the component P.

So-called slow liquid initiators are outstandingly suited in particular for discontinuous processes where a phase of low viscosity is required for the shaping step.

The liquid initiator can thereby be metered for example by means of a mixing assembly during a defined time interval directly into a lactam melt which flows during a defined time interval, after which the activated melt flow for the provided process, for example the wetting and complete penetration of filament structures is used directly in the resin transfer moulding process.

One can of course also activate lactam melt masses in portions via rapid mixing with slow liquid initiators and subsequently process them for example in monomer casting in injection moulding, in rotational moulding, in centrifugal moulding and in further batchwise processes. Numerous variation possibilities being offered, for example additives being able to be mixed in with the initiator at the same time and also the mould being able to contain coatings, additives or components to be covered, for example in-laid.

All these variation possibilities have the advantage that, during a defined time interval, the melt is exceptionally thin.

A great suitability in practice for many processes is given furthermore from the possibility of adapting the component P of the liquid initiators to the selected method and the product properties.

Lactam-12 is particularly preferred for the implementation of the presented methods because it can be converted entirely into polylactam in a broad temperature range of for example 170–320° C. and in addition no lactam is reformed subsequently.

As is common in the case of anionic lactam polymerisation and as is known to a person skilled in the art, dry lactam melt has to be used and the method has to proceed under dry inert gas.

This applies in particular when the melt is in intensive contact with a gaseous phase, such as for example during immersion, spraying and covering processes.

A substantial advantage in all these methods is furthermore that the liquid initiator according to the invention serves directly as catalyst and activator and in this manner immediately can start the polymerisation upon contact with the lactam melt, and that not two melt steams, one containing the catalyst and one containing the activator, has to be mixed previously and intensively so that a uniform polymerisation occurs.

As emerges already from the method description with the numerous variation possibilities, a multiplicity of utility objects can be produced based on the liquid initiators and processes according to the invention namely:

pipes, profiles, coverings, coatings, injection moulding parts, hollow bodies, casting parts, composite material parts, with continuous and discontinuous structure embossing and also granulates which can be remelted and reprocessed in commonly used thermoplastic processes. Profiles or also granulates which are reinforced with long fibres can thereby be produced directly in the pultrusion method, said granulates being able to be reshaped in a subsequent step, preferably following the injection moulding method, into utility objects and the fibres are preferably glass fibres or C-fibres.

The invention relates furthermore to a polymer granulate which has been produced using the liquid initiator as described above (patent claims 24 to 28). The polymer granulate according to the invention is distinguished in particular by the fact that it can be stored over a very long time span. The polymer granulate can be remelted and further processed using shaping tools into products as already described above. The polymer granulate according to the invention is obtained preferably from lactam-6 and/or lactam-12. In the case of the polymer granulate according to the invention, the liquid initiator can be used in a concentration of 0.3–10% by weight, preferably 0.5–3.0% by weight.

In the case of the production of the polymer granulate, the variant is particularly preferred in which the polymerisation is implemented in a twin screw extruder.

The invention is now intended to be explained in more detail with reference to examples.

EXAMPLES

Preceding the examples there is a Table which has the abbreviations used and which in addition contains the molecular weights or, in the case of bifunctional protic compounds, the equivalent weight.

The examples are summarised subsequently in Table form, the procedure being described more precisely respectively in the case of one series of tests of the same type and respectively part a) summarising the stoichiometric composition of the liquid initiator and part b) the polymerisation conditions and the analysis results of the polymerisation tests.

In the examples, the following meanings apply for the solvation medium, S:

| Abbreviation | Substance | Equivalent weight |
| --- | --- | --- |
| NMP | n-methylpyrrolidone | 99 |
| NOP | n-octylpyrrolidone | 197 |
| DMEU | Dimethylethylene urea | 114 |
| DMPU | Dimethylpropylene urea | 128 |

-continued

| Abbreviation | Substance | Equivalent weight |
| --- | --- | --- |
| for the carbodiimides, C: | | |
| DCC | Dicyclohexyl carbodiimide aliphatic carbodiimide | 206 |
| S7000 | Bis-(2,6-diisopropylphenyl) carbodiimide | 362.5 |
| for the protic compounds, P: | | |
| MeOH | methyl alcohol | 32 |
| Ny | Nylostab S-EED* | 221 |
| I 245 | Irganox 245** | 294 |
| T 312 | Tinuvin 312** | 312 |
| T 571 | Tinuvin 571** | 394 |
| I 5057 | Irganox 5057** | 393 |
| Amide 23 | Linear carboxamide made of isotridecylamine and acetic acid | 241 |
| for the bases, B: | | |
| NaOMe | Sodium methylate applied for example as approx. 30% solution in methanol or as solid substance | 54 |

*Commercial product of the Company CLARIANT, Basle
**Commercial products of the Company CIBA SC, Basle In the Tables a), the following meanings are
1 the carbodiimide C
2 the protic compound P, where it should be taken into account that in one example often a combination of protic compounds was used
3 the base B which can serve in preferred examples (example Na.Ome, Na.Oet) also directly as protic compound
4 the solvation medium S, here also a combination of solvation media are partly used
5 the equivalent ratio of the components used. If a plurality of protic compounds or S media is used simultaneously, then its equivalent proportions are cited together
6 the solid material proportion of the batch comprising the conversion product
7 the concentration of the active component of the liquid initiator, expressed as equivalent per kg of the total liquid initiator formulation In Table b) which contains polymerisation tests, the following mean:
8 the proportion by weight of liquid initiator added to the lactam melt
9 the number of lactam molecules per active liquid initiator particle
10 the temperature of the lactam melt during the course of polymerisation in ° C.
11 the selected polymerisation time in min
12 the selected lactam quantity in g
13 the time $T_u$ (in seconds), after which a magnetic agitator of a common construction, continuously mixing the melt remains stationary, as a consequence of the increasing viscosity of the polymerising melt
14 the relative solution viscosity of the polymer
15 the melting point maximum of the polymer from the DSC-measurement curve in ° C.
16 the methanol extract proportion of the product comprising unconverted lactam and also solvation medium and released protic compound.

Tests 1 to 7 (Table 1a and 1b)

In the examples 1 to 7, a liquid initiator was used which contained DCC as compound C. In addition, Nylostab S-EED is generally the protic medium P which is used partly in addition with a linear carboxamide P occurring respectively in a defficiency relative to B, the base, so that a part of the methylate can act directly as protic medium P.

As the general procedure for production the solvation medium S is placed in the reaction vessel under inert gas and exclusion of moisture, the components P are dissolved therein and then the base B (as 30% methanolic solution of NaOMe) is dropped in slowly under heat and vacuum effect at 80–100° C., the methanol (solvent proportion and neutralisation product) is continuously removed and the DCC is thereafter added, after which the reaction mixture is heated until a clear solution occurs and then it is cooled to room temperature. After that, the storage-stable liquid initiator is subjected to a polymerisation test corresponding to Table 1b).

Polymers are produced which upon solidification are separated spontaneously from the glass wall and produce a polylactam matrix which is directly stabilised against heat- and weathering decomposition.

Although each liquid initiator already contains components which take over additional tasks in the polymer, it was only applied in a concentration of 2.7–3.85% by weight in order to produce polylactam with an average polymerisation degree of 200 (number average).

The polymers have respectively the expected value of the relative solution viscosity, they have a high melting point and low extract proportion and are of a light colour.

Tests 8 to 14 (Tables 2a and 2b)

The tests 8 to 14 are compiled in the Tables 2a and 2b. The protic compound P is thereby used respectively in molar excess relative to the carbodiimide C and partly also to the base B so that its deprotonated main proportion can react with the carbodiimide.

In all cases, protic polyamide stabilisers (heat- and weathering degradation) or auxiliary processing aids represent a substantial proportion of P and a residual proportion respectively comprises lactam-6.

For production, the components P were again dissolved in S and then the neutralisation medium NaOMe (up to approximately 30% dissolved in methanol) was dropped in under a vacuum effect at 80–100° C. and consequently methanol was continuously withdrawn (solvent for the base and neutralisation product). After completed deprotonation of P, the carbodiimide was added at 80–100° C. and agitated at 80–100° C. until a clear solution occurred, then it was cooled to room temperature and the provided liquid initiator according to Table 2 was used for the polymerisation of lactam-12.

As the analysis results show, the polymerisation is initiated respectively slowly and leads to a polymer of high viscosity, of melting point above 170° C. and the total extract values respectively below 6% by weight.

In the case of polymer 11, containing auxiliary processing aids as protic compound, release of the polymer is effected spontaneously after cooling.

In the case of the liquid initiators according to Table 2, a weight proportion respectively of approximately 3–4% must be used in order to achieve a polymerisation degree of 200 (number average) because the stabilisers used have molecular weights respectively of more than 300 for the purpose of preventing volatilisation.

Tests 15 to 21 (Table 3a and 3b)

In Table 3a and 3b, tests with aromatic carbodiimide are compiled. The selected tests show the broad variation possibility of the invention in which in tests 15 to 18, the base represents completely the protic compound in test 19, the protic compound is derived respectively to approximately 50% from methanol and from lactam-6, and in test 20 and 21, 50% comprises stabiliser.

In order to demonstrate the variation width of the production possibility, in addition various synthesis paths were taken for FI production. Test 15–17 correspond thereby to the same formulation and, in test 18, only the proportion of solvation medium is increased.

In these cases:

In test 15, the NaOMe was introduced into S as 30% solution at 80° C. and the methanol was completely removed via heat and vacuum effect, after which the carbodiimide was added and converted with the NaOMe at 80–100° C. for 30 minutes and then was cooled.

In test 16 and 17, the carbodiimide was dissolved in S at room temperature, then heated and subsequently the NaOMe was dropped slowly in as methanolic solution under simultaneous action of vacuum, in test 16, the temperature of the solution being at 90–95° C. and, in test 17, at 110–120° C. and this temperature being maintained respectively for approximately 70 minutes.

In test 15 and 16, there followed a post treatment for the purpose of total removal of residual methanol at 120° C. for 100 minutes and a vacuum of 50 torr. Because in test 15, 16 and 17, a precipitate proportion remained, the S proportion was increased in test 18 from 6 to 8 solvation molecules per C and production continued corresponding to test 17, after which a product resulted without a solid material proportion.

In test 19 and 20, where lactam-6 or Nylostab S-EED is used as special P in addition to the NaOMe, the P was respectively dissolved in S, then residual methanol was removed at approximately 100° C. and under the effect of vacuum and slow temperature increase until 130° C. for approximately 80 minutes, after which the supply of heat was interrupted and the C was added at approximately 90° C. and subsequently cooled to room temperature within approximately 1 hour. These products show no proportion of precipitate.

In test 21, the procedure was implemented again such that P and C were dissolved together in S, heated to approximately 95° C., and then the NaOMe dissolved in methanol was added under the effect of vacuum and heat and the vacuum was maintained for another 50 minutes at 95° C. and then cooling took place. The resulting FI is of a very light intrinsic colour and still has a residual methanol proportion which somewhat delays the course of polymerisation.

All the liquid initiators based on stabiliser 7000 have relatively long $T_u$ times and are therefore specially suited for methods where the newly activated lactam melt must pass through special process steps, such as for example the production of fibre composite materials, a complete impregnation of the fibre structures ideally being ensured.

Test 22

It was tested in addition whether a part of the carbodiimide C can be replaced by isocyanate I in the FI according to the invention.

For this purpose, phenylisocyanate PI was used in a reaction batch of 30 g solid material proportion, with DCC in the mol ratio of 40:60, Nylostab S-EED was used up to 0.8 as protic medium P and converted with 1.02 NaOMe (per equivalent parts relative to PI+DCC), the reaction being implemented in the S medium corresponding to 4 DMPU and 3 NMP (per mol parts relative to the sum PI+DCC).

For this purpose, Ny was dissolved in S, heated to 100° C., NaOMe was added thereafter as 30% solution in MeOH and the PI was added subsequently in drops. Subsequently a vacuum was applied for 30 minutes at 100° C. then the DCC was added at 100° C., left for a further 10 minutes at 100° C. and then was cooled.

An FI without formation of residue resulted which, in the polymerisation test under conditions as described in Table 1b, effected a time $T_u$ of 25 seconds and led to polylactam-12 with a melting point of 177.2° C. and a solution viscosity of 1.865.

In addition, many application tests were implemented with the described liquid initiators.

It was shown thereby as a general rule that, in the case of lactam-12, the polymerisation can be accelerated greatly by increasing the temperature.

If one thereby introduces the respective FI such that there is an application concentration of 0.5% equivalent, relative to lactam-12, (1 FI particle to 200 lactam molecules), then a time of approximately 5 minutes is adequate at 250° C. and of only approx. 1 minute at 300° C. for the full conversion of the lactam into polylactam (residual lactam content 0.5–1.0% by weight). If such a high temperature is maintained for longer times side reactions take place, and cross-linking structures known from the literature being able to become dominant, as a result of which the strength and toughness increases on the one hand and the further processibility becomes more difficult on the other hand.

In addition, lactam-6 with FI according to test 9, 22 and 29 and with a part of FI corresponding to 0.5% equivalent, relative to lactam-6, was also converted into polylactam.

For this purpose, the lactam was dried carefully. The polymerisation was effected identically to the conditions for lactam-12, i.e. at 200° C. for 30 minutes. The products have respectively a residual lactam content of approximately 10% by weight and an SMP maximum in DSC of approximately 215° C. and display spontaneous detachment from the vessel wall.

TABLE 1a

| Test No. | Carbodiimide C 1 | Protic compound P 2 | Base B 3 | Solvation medium S 4 | Equivalent ratio C:P:B:S 5 | Solid material total (g) 6 | Concentration liquid initiator [mol/kg] 7 |
|---|---|---|---|---|---|---|---|
| 1 | DCC | Ny | NaOMe | NMP NOP | 1:0.52:1.03:3 2 | 30 | 0.84 |
| 2 | DCC | Ny | NaOMe | NOP DMEU | 1:0.52:1.03:3 4 | 30 | 0.65 |
| 3 | DCC | Ny amide 23 | NaOMe | DMPU | 1:0.30:1.03:5 0.42 | 30 | 0.88 |

TABLE 1a-continued

| Test No. | Carbodiimide<br>C<br>1 | Protic<br>compound<br>P<br>2 | Base<br>B<br>3 | Solvation<br>medium<br>S<br>4 | Equivalent<br>ratio<br>C:P:B:S<br>5 | Solid material<br>total (g)<br>6 | Concentration<br>liquid initiator<br>[mol/kg]<br>7 |
|---|---|---|---|---|---|---|---|
| 4 | DCC | Ny<br>amide 23 | NaOMe | DMEU<br>NOP | 1:0.30:1.03:3<br>0.42   3 | 30 | 0.70 |
| 5 | DCC | Ny | NaOMe | NMP<br>NOP | 1:0.52:1.03:3<br>2 | 30 | 0.84 |
| 6 | DCC | Ny | NaOMe | NMP | 1:0.52:1.03:6 | 30 | 0.92 |
| 7 | DCC | Ny | NaOMe | NOP | 1:0.52:1.03:4 | 30 | 0.78 |

TABLE 1b

| Polymerisation conditions | | | | | Analysis results | | | |
|---|---|---|---|---|---|---|---|---|
| % by wt FK<br>8 | for PG-N<br>9 | $T_1$ ° C.<br>10 | $t_1$ min<br>11 | LC-12, g<br>12 | $Tu_1$ sec.<br>13 | ηrel.<br>14 | DSC max<br>15 | Extract, %<br>16 |
| 3.00 | 200 | 200 | 30 | 50 | 222 | 1.715 | 176.0 | 2.81 |
| 3.85 | 200 | 200 | 30 | 50 | 135 | 1.794 | 176.4 | 2.31 |
| 2.89 | 200 | 200 | 30 | 50 | 94 | 1.801 | 177.4 | 1.33 |
| 3.57 | 200 | 200 | 30 | 50 | 220 | 1.830 | 176.3 | 3.36 |
| 3.00 | 200 | 200 | 30 | 50 | 263 | 1.721 | 176.2 | 2.88 |
| 2.72 | 200 | 200 | 30 | 50 | 289 | 1.730 | 176.3 | 3.48 |
| 3.20 | 200 | 200 | 30 | 50 | 207 | 1.800 | 178.9 | 2.90 |

TABLE 2a

| Test No. | Carbodiimide<br>C<br>1 | Protic<br>compound<br>P<br>2 | Base<br>B<br>3 | Solvation<br>medium<br>S<br>4 | Equivalent<br>ratio<br>C:P:B:S<br>5 | Solid material<br>total (g)<br>6 | Concentration<br>liquid initiator<br>[mol/kg]<br>7 |
|---|---|---|---|---|---|---|---|
| 8 | DCC | Ny<br>CL | NaOMe | NOP<br>DMEU | 1:0.35:1.02:3<br>0.70   4 | 18 | 0.698 |
| 9 | DCC | I 245<br>Ny<br>T 571<br>CL | NaOMe | NOP<br>DMEU | 1:0.15:1.02:3<br>0.15   4<br>0.10   —<br>0.65   — | 18 | 0.680 |
| 10 | DCC | Ny<br>I 5057<br>CL | NaOMe | NOP<br>DMEU | 1:0.30:1.02:3<br>0.05   4<br>0.70   — | 18 | 0.693 |
| 11 | DCC | EBS<br>CL | NaOMe | NOP<br>DMEU | 1:0.30:1.05:4<br>0.70   3 | 20 | 0.654*) |
| 12 | DCC | Ny<br>CL | NaOMe | NOP<br>DMEU | 1:0.30:1.30:3<br>1.00   4 | 18 | 0.680 |
| 13 | DCC | Ny<br>T 571<br>CL | NaOMe | NOP<br>DMEU | 1:0.30:1.30:3<br>0.05   4<br>0.95   — | 18 | 0.674 |
| 14 | DCC | Ny<br>T 571<br>CL | NaOMe | NOP<br>DMEU | 1:0.60:1.55:3.5<br>0.08   4.0<br>0.90   — | 25 | 0.600 |

TABLE 2b

| Polymerisation conditions | | | | | Analysis results | | | |
|---|---|---|---|---|---|---|---|---|
| % by wt FK<br>8 | for PG-N<br>9 | $T_1$ ° C.<br>10 | $t_1$ min<br>11 | LC-12, g<br>12 | $Tu_1$ sec.<br>13 | ηrel.<br>14 | DSC max<br>15 | Extract, %<br>16 |
| 3.60 | 200 | 200 | 25 | 50 | 211 | 1.962 | 174.9 | 2.95 |
| 3.70 | 200 | 200 | 25 | 50 | 255 | 1.841 | 170.7 | 5.46 |
| 3.61 | 200 | 200 | 25 | 50 | 210 | 1.984 | 173.5 | 2.54 |
| 3.10 | 200 | 200 | 25 | 50 | 244 | 2.355 | 175.1 | 4.15 |
| 3.68 | 200 | 200 | 25 | 50 | 139 | 2.075 | 175.4 | 1.79 |
| 3.71 | 200 | 200 | 25 | 50 | 201 | 2.036 | 176.6 | 1.84 |
| 4.17 | 200 | 200 | 25 | 50 | 225 | 1.889 | 176.0 | 3.67 |

TABLE 3a

| Test No. | Carbodiimide C 1 | Protic compound P 2 | Base B 3 | Solvation medium S 4 | Equivalent ratio C:P:B:S 5 | Solid material total (g) 6 | Concentration liquid initiator [mol/kg] 7 |
|---|---|---|---|---|---|---|---|
| 15 | S 7000 | — | NaOMe | DMPU | 1:—:1.01:6 | 30 | 0.844 |
| 16 | S 7000 | — | NaOMe | DMPU | 1:—:1.01:6 | 30 | 0.844 |
| 17 | S 7000 | — | NaOMe | DMPU | 1:—:1.01:6 | 30 | 0.844 |
| 18 | S 7000 | — | NaOMe | DMPU | 1:—:1.01:8 | 30 | 0.692 |
| 19 | S 7000 | CL | NaOMe | DMPU | 1:0.49:1.01:6 | 40 | 0.812 |
| 20 | S 7000 | Ny | NaOMe | DMPU | 1:0.5:1.01:7 | 40 | 0.707 |
| 21 | S 7000 | Ny | NaOMe | DMPU | 1:0.5:1.01:7 | 40 | 0.707 |

TABLE 3b

| Polymerisation conditions | | | | | Analysis results | | | |
|---|---|---|---|---|---|---|---|---|
| % by wt FK 8 | for PG-N 9 | $T_1$ °C. 10 | $t_1$ min 11 | LC-12, g 12 | $Tu_1$ sec. 13 | ηrel. 14 | DSC max 15 | Extract, % 16 |
| 2.96 | 200 | 200 | 30 | 50 | 280 | 1.909 | 168.3 | 10.87 |
| 2.96 | 200 | 200 | 30 | 50 | 270 | 1.933 | 169.4 | 8.32 |
| 2.96 | 200 | 200 | 30 | 50 | 260 | 1.917 | 169.0 | 9.73 |
| 3.61 | 200 | 200 | 30 | 50 | 225 | 1.982 | 173.6 | — |
| 3.08 | 200 | 200 | 30 | 50 | 225 | 2.053 | 171.7 | 5.16 |
| 3.54 | 200 | 200 | 30 | 50 | 255 | 1.938 | 171.0 | 5.54 |
| 3.54 | 200 | 200 | 30 | 50 | 380 | 1.626 | 159.9 | — |

What is claimed is:

1. A liquid initiator for implementation of anionic lactam polymerisation, comprising a reaction product of carbodiimide C with a protic compound P and a base B in an aprotic solvation medium S.

2. The liquid initiator according to claim 1, wherein the carbodiimide C has an aliphatic, cycloaliphatic, aromatic or aliphatic-aromatic basic structure.

3. The liquid initiator according to claim 2, wherein the carbodiimide C is selected from N,N'-diisopropyl carbodiimide, N,N'di-(o-tolyl) carbodiimide, N,N'-dicyclohexyl carbodiimide, 2,2',6,6'-tetraisopropylphenyl carbodiimide or poly-(2,2-diisopropyl)-p-phenylene carbodiimide.

4. The liquid initiator according to claim 1, comprising a reaction product in which the carbodiimide has been replaced by 1–50% equivalent isocyanate.

5. The liquid initiator according to claim 1, wherein the protic compound P has a $pk_1 > 13$.

6. The liquid initiator according to claim 5, wherein the protic compound P is selected from alcohols with 1–12 C-atoms, carboxamides, amines and/or sterically hindered aliphatic amines.

7. The liquid initiator according to claim 6, wherein the carboxamides are composed of linear and/or cyclic monomers, with 2–20 C-atoms.

8. The liquid initiator according to claim 7, wherein the carboxamide has in addition structural elements which have a sterically hindered protic group.

9. The liquid initiator according to claim 6, wherein the amines are substituted aromatic amines.

10. The liquid initiator according to claim 1, wherein the cation of the base B is an alkali- or alkaline earth ion or tetraalkylammonium and the base is selected from alcoholate, amide, hydride or alkyl anion.

11. The liquid initiator according to claim 10, wherein the base B is an alkali- or alkaline earth alcoholate.

12. The liquid initiator according to claim 1, wherein the solvation medium S is an aliphatic, cycloaliphatic or aromatic organic compound which has solvating structural elements which have no azide H-atoms.

13. The liquid initiator according to claim 12, wherein the solvation medium S is a polar aprotic compound selected from the group, etherified polyglycols, liquid phthalic esters, N-alkylated urea compounds, N-alkylated carboxamides or mixtures thereof.

14. The liquid initiator according to claim 13, wherein the urea compound is a tetraalkyl urea with 1–20 C-atoms.

15. The liquid initiator according to claim 13, wherein the solvation medium S is a cyclic 5–7 member N-alkylated carboxamide and the alkyl radical has 1–12 C-atoms, optionally having heteroatoms.

16. The liquid initiator according to claim 13, wherein the solvation medium S is N-methylpyrrolidone, N-octylpyrrolidone, N-cyclohexyl pyrrolidone, N-octylcaprolactam or a mixture thereof.

17. The liquid initiator according to claim 1, comprising additional additives.

18. The liquid initiator according to claim 1, wherein the reaction product has been obtained with the proviso that B:P:C in a ratio of 0.2–1.1:0.2–4:1 have been used.

19. The liquid initiator according to claim 18, wherein the mol ratio B:P:C is b 0.8–1.1:0.8–1.2:1.

20. A method for producing a liquid initiator according to claim 1, wherein the reaction product is produced in the solvation medium S under inert gas control and exclusion of moisture in the range of room temperature up to 140° C., low molecular solvents for the base and neutralisation products of the base, being removed.

21. The method according to claim 20, wherein the compound P is converted with the base B in a first step so that P occurs in basic form, and in that the deprotonated compound P is then converted with the carbodiimide and conversion is effected in the solvation medium.

22. The method according to claim 20, wherein:

P is dissolved separately in a proportion of solvation medium S; and

P is converted via base addition B into the anionic salt form; and volatile reaction products and also solvent and protective medium residues, which impede polymerisation, are removed, and wherein following the carbodiimide in another portion of the solvation medium S and the deprotonated compound P in the solvation medium S are unified and converted into liquid initiator.

23. The method according to claim 20, wherein C and P are dissolved simultaneously in S, and B is added subsequently, after which the base in the protonated form is removed.

24. A polymer granulate produceable by continuous or discontinuous anionic polymerisation of lactam with a liquid initiator according to claim 1.

25. The polymer granulate according to claim 24, wherein lactam-6 and/or lactam-12 have been used as lactam.

26. The polymer granulate according to claim 24 wherein the liquid initiator has been added to the lactam melt in a concentration of 0.3–0% by weight.

27. The polymer granulate according to claim 24, wherein the liquid initiator has been set at a concentration of 0.5–3% by weight.

28. The polymer granulate according to claim 24, wherein the polymer granulate has been produced continuously on a twin shaft extruder.

29. A method for direct production of commercial products consisting of polylactam in a discontinuous or continuous process selected from monomer casting, extrusion, injection moulding, centrifugal moulding and rotational moulding, pultrusion methods, immersion methods or coating methods, spraying methods, comprising adding the liquid initiator of claim 1 respectively to the lactam melt.

30. The liquid initiator according to claim 6, wherein the protic compound is selected from alcohols with 1–6 C-atoms.

31. The liquid initiator according to claim 14, wherein the urea compound is a tetraalkyl urea with the cyclic structure according to the general formula I,

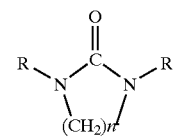

I wherein R is a methyl radical.

* * * * *